United States Patent Office 3,538,035
Patented Nov. 3, 1970

3,538,035
STABLE UREA-FORMALDEHYDE SOLUTIONS
George K. Cleek, Chester, and Bing T. Poon, Colonial Heights, Va., assignors to Allied Chemical Corporation, New York, N.Y., a corporation of New York
No Drawing. Filed Sept. 13, 1965, Ser. No. 487,048
Int. Cl. B22c 1/22; C08g 9/10
U.S. Cl. 260—29.4
6 Claims

ABSTRACT OF THE DISCLOSURE

A stable solution containing furfuryl alcohol which has been mixed with a partially polymerized urea-formaldehyde concentrate. The solution is produced by heating at a temperature in the range of 65–110° C. an aqueous nonpolymerized urea-formaldehyde concentrate until the viscosity increases to at least 400 centipoises. The resulting heated concentrate is mixed with furfuryl alcohol to produce a solution having a pH of 4 to 6.5.

---

This invention relates to stable solutions of urea-formaldehyde concentrate in furfuryl alcohol.

It is known to produce mixtures of aqueous, non-polymerized urea-formaldehyde concentrate and furfuryl alcohol. U.S. Pat. 3,168,489, teaches that such mixtures can be combined with additional urea and sand to produce foundry core compositions of high quality. However, such mixtures as are prepared in accordance with the teaching of this patent are characterized by their limited stability. Such compositions have been found to become turbid within four weeks and to throw down precipitates within six weeks at room temperature. This is unfortunate, because it has been found convenient, in certain instances, to prepare the urea-formaldehyde concentrate-furfuryl alcohol mixture at one place and ship it elsewhere for later use in the making of foundry core compositions. It is, therefore, desirable to produce such mixtures which can be stored for considerable lengths of time, and even more desirable to produce such mixtures which can be shipped under temperature conditions which will range considerably above and below normal room temperature.

Accordingly, it is an object of the present invention to provide solutions of urea-formaldehyde in furfuryl alcohol which are characterized by improved stability. Other objects will be obvious hereinafter.

The novel products of the present invention are stable solutions comprising a partially polymerized urea-formaldehyde concentrate and furfuryl alcohol and having a pH of about 4 to 6.5, preferably about 5.5 to 6.

By "stable" is meant that the solutions remain clear and do not throw down any precipitate for at least six months at temperatures of about 20° to 30° C. Moreover, solutions prepared in accordance with the preferred mode of this invention remain clear and free from precipitates at temperatures in the range −2° C. to 40.5° C.

The products of the present invention are produced by a process which comprises heating at a temperature in the range of about 65° to about 110° C., preferably 90° to 100° C., an aqueous, non-polymerized urea-formaldehyde concentrate, until the viscosity of said concentrate at 25° C. increases to at least 400 centipoises, preferably 400 to 800 centipoises, and mixing the thus treated, partially polymerized concentrate with furfuryl alcohol.

The non-polymerized urea-formaldehyde concentrate used in the process of the present invention should have a pH in the range 5 to 8.5 preferably 6.5 to 8 and contain about 10% to 20%, by weight, water, about 55% to 67% formaldehyde and about 20% to 27% urea, i.e. about 2 to 3.4 parts by weight, formaldehyde per part urea. Such concentrates are well known and are prepared by partially reacting urea and formaldehyde in the presence of water in certain proportions and under controlled conditions of pH and temperature as described, for example, in U.S. Pat. 2,652,377. They are aqueous solutions of urea, formaldehyde and equilibrium reaction products as referred to in U.S. Pat. 3,168,489 mentioned above, and typified by UF Concentrate-85 manufactured and sold by Allied Chemical Corporation. For the preparation of solutions ideally suited for the production of foundry core compositions, it is preferred to use a urea-formaldehyde concentrate containing about 60%, by weight, formaldehyde and 25%, by weight, urea and no more than about 15%, by weight, water. The formaldehyde and urea may exist both in the uncombined form and the combined form, e.g. as methylol urea and urea combined with formaldehyde.

The heat treatment must be carried out for a sufficient time to increase the viscosity of the urea-formaldehyde concentrate to at least 400 centipoises in order to assure that the final product will have the desired stability. The preferred viscosity range is 400 to 800 centipoises. If the viscosity is increased beyond 800 centipoises, additional heat and time are consumed without any compensating benefit. In addition, higher viscosity makes the concentrate less easy to handle.

In order to obtain the desired degree of partial polymerization within a reasonably short time, it is preferred to carry out the heat treatment at a temperature of at least 80° C. and, most preferably 90° to 100° C. Lower temperatures can be used, but the greater amount of time required renders their use less desirable. Below a temperature of about 65° C., a stable product is not obtained. The lower the temperature used for heating, the higher the viscosity in the range 400 to 800 centipoises, which should be achieved in order to obtain a product stable over the wider temperature ranges. The preferred temperature range also permits the use of conventional, relatively inexpensive heating means rather than high pressure vessels, and avoids the danger of hydrolysis of the urea.

The heat treated partially polymerized urea-formaldehyde concentrate is preferably cooled to about 20° to 30° C. prior to mixing with the furfuryl alcohol. However, cooling is not necessary, and it has been found that a satisfactory product is obtained by adding the hot partially polymerized concentrate to the furfuryl alcohol which is at about room temperature, so that substantially no reaction of the concentrate with the alcohol occurs.

The heat treatment, which must be carried out prior to the admixture with furfuryl alcohol, results in partial polymerization of the urea-formaldeyhyde concentrate, demonstrated by the fact that it becomes immiscible with ethyl alcohol. This is a convenient indication of when the desired degree of polymerizaion has been reached.

The proportions of heat-treated concentrate and furfuryl alcohol, are not critical. Solutions containing from 5% to 95%, by weight, of the partially polymerized concentrate have been found to be stable. However, the solutions exhibiting the highest degree of stability are those containing about 40% to 60% concentrate. In addition to being highly stable, these preferred compositions do not contain unnecessarily high amounts of furfuryl alcohol and are best suited for use in the production of foundry core compositions.

During the heat treatment of the urea-formaldehyde concentrate its pH decreases sufficiently so that no further pH adjustment is needed after it is combined with the furfuryl alcohol.

The following examples illustrate the preferred mode of carrying out the present invention.

EXAMPLE 1

UF Concentrate-85, a commercially available aqueous, nonpolymerized product containing about 60%, by weight, formaldehyde, 25% urea and 15% water and having a ph of 8, was charged to a pot equipped with agitator, thermometer, and means for heating and cooling. Heat was applied and the temperature rose from 24° C. to 92° C. in forty minutes. The temperature of the UF Concentrate-85 was kept at 92° to 97° C. for two hours; it was then cooled to 25° C. The viscosity of the UF Concentrate-85 before and after heating is shown:

|  | pH | Viscosity, centipoises, 25° C. |
|---|---|---|
| Before heating | 8.0 | 214 |
| After heating | 5.5 | 442 |

The heat treated concentrate was found to be immiscible in ethyl alcohol whereas the starting, nonpolymerized UF Concentrate-85 was miscible. Forty-two parts, by weight, of of furfuryl alcohol and 58 parts, by weight, of the heat treated UF Concentrate-85 were mixed and stored at room temperature, and remained clear without precipitation for over six months. Solutions prepared in this manner are stable at temperatures as low as −2° C. and as high as 40.5° C. for six months.

By comparison, a solution prepared by mixing 42 parts, by weight, of furfuryl alcohol and 58 parts, by weight, of untreated UF Concentrate-85 is found to become turbid after about four weeks at about 25° C. and to contain precipitated solids after six weeks.

The following example shows that it is not necessary to prepare the solution of urea-formaldehyde and furfuryl alcohol immediately after heat treating urea-formaldehyde concentrate. Rather, after the necessary viscosity has been reached by heat treatment, the urea-formaldehyde concentrate can be stored for several months, during which time its viscosity usually increases further, without adversely affecting the stability of the urea-formaldehyde concentrate-furfuryl alcohol solution which is subsequently prepared.

EXAMPLE 2

UF Concentrate-85, having a viscosity of 214 centipoises at 25° C. and a pH of 8.0 was heat treated as in Example 1. After heating, it had a pH of 5.5 and a viscosity of 440 centipoises and was immiscible in ethyl alcohol. This material was stored at room temperature for six and a half months after which time its viscosity was 776 centipoises. Two hundred-ten parts, by weight, of furfuryl alcohol were mixed with 290 parts, by weight, of the aged heat treated UF Concentrate-85 and stored. The solution remained clear, without precipitation, for more than six months.

PREPARATION OF FOUNDRY CORES

About 200 parts, by weight, urea is added to 1500 parts, by weight, of the product of Example 1 and the mixture is stirred until the urea dissolves. The pH is lowered to 5.45 with 1.5 parts, by weight, glacial acetic acid. The mixture is heated to 95° C. in 18 minutes, at which point a slight exothermic reaction occurs and temperature rises to 97° C. Temperature is maintained at 94.5–97.5° C. for two hours. The reaction mixture is then cooled to room temperature and the pH is raised from 5.7 to 6.95 with 4 parts, by weight, of 98% triethanolamine. The resinous product is a clear orange liquid with Gardner viscosity of V. Fifty parts of this resinous product are added to a mixture of 2500 parts Wedron 5015, a clean silica sand, and 10 parts of a catalyst prepared by dissolving 25 parts, by weight, ammonium chloride and 80 parts, by weight, urea in 95 parts water. Then the resulting composition is mulled for three minutes.

Tensile bars are prepared from the sand mix on a hot core blower unit at 425° F. cure temperature. The following tensile strengths are obtained on the bars thus prepared:

| Cure time, seconds | Tensiles, p.s.i. | Average, p.s.i. |
|---|---|---|
| 10 | 481, 483, 473 | 479 |
| 20 | 518, 440, 526 | 495 |
| 30 | 496, 438, 432 | 452 |
| 50 | 465, 495, 460 | 473 |

The green sand mix has a storage life of greater than six hours at room temperature.

We claim:
1. A process for producing a stable solution which comprises heating at a temperature in the range 65° C. to about 100° C. an aqueous nonpolymerized urea-formaldehyde concentrate until the viscosity of said concentrate increases to at least 400 centipoises and the concentrate is immiscible in ethyl alcohol, to cause a partial polymerization thereof, and mixing the partially polymerized concentrate with furfuryl alcohol so that substantially no reaction of the concentrate with the alcohol occurs.

2. The process of claim 1 wherein the aqueous nonpolymerized urea-formaldehyde concentrate contains 20 to 27%, by weight, urea, 55% to 67%, by weight, formaldehyde and 10% to 20%, by weight, water and the pH of the resultant partially polymerized concentrate is in the range of 5 to 8.5.

3. The process of claim 1 wherein the urea-formaldehyde concentrate is heated at a temperature in the range 90° to 100° C.

4. The process of claim 1 wherein the heating is discontinued when the viscosity of urea-formaldehyde concentrate is within the range 400 to 800 centipoises.

5. The process of claim 2 wherein the aqueous nonpolymerized urea-formaldehyde concentrate contains about 25%, by weight, urea, about 60%, by weight, formaldehyde and no more than 15%, by weight, water.

6. The process of claim 2 wherein the heat treated urea-formaldehyde concentrate is cooled to about 20° to 30° C. before being mixed with the furfuryl alcohol.

References Cited
UNITED STATES PATENTS

| | | | |
|---|---|---|---|
| 2,510,496 | 6/1950 | Carlin | 260—70 |
| 2,652,377 | 9/1953 | Kise. | |
| 3,168,489 | 2/1965 | Brown et al. | |
| 3,297,611 | 1/1967 | Hill | 260—70 |
| 2,634,255 | 4/1953 | Patterson. | |
| 3,168,490 | 2/1965 | Brown et al. | 260—29.4 |

MORRIS LIEBMAN, Primary Examiner

H. H. FLETCHER, Assistant Examiner

U.S. Cl. X.R.

164—43; 260—30.4, 70, 829